United States Patent
Ko et al.

(10) Patent No.: US 11,531,468 B2
(45) Date of Patent: Dec. 20, 2022

(54) SYSTEM AND METHOD FOR MANAGING STORAGE SPACE

(71) Applicant: Apple Inc., Cupertino, CA (US)

(72) Inventors: Steve S. Ko, San Francisco, CA (US); Jean-Pierre Ciudad, San Francisco, CA (US); Kazuhisa Yanagihara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 15/274,736

(22) Filed: Sep. 23, 2016

(65) Prior Publication Data

US 2017/0357453 A1     Dec. 14, 2017

Related U.S. Application Data (60) Provisional application No. 62/348,824, filed on Jun. 10, 2016.

(51) Int. Cl.
*G06F 3/06*      (2006.01)
*G06F 12/02*     (2006.01)

(52) U.S. Cl.
CPC .......... *G06F 3/0608* (2013.01); *G06F 3/0605* (2013.01); *G06F 3/067* (2013.01); *G06F 3/0641* (2013.01); *G06F 3/0649* (2013.01); *G06F 3/0652* (2013.01); *G06F 12/023* (2013.01)

(58) Field of Classification Search
CPC .................................................... G06F 3/0608
See application file for complete search history.

(56) References Cited

U.S. PATENT DOCUMENTS

| | | | | |
|---|---|---|---|---|
| 5,893,920 A | * | 4/1999 | Shaheen | G06F 12/0813 707/E17.01 |
| 9,064,013 B1 | * | 6/2015 | Gay | G06F 16/951 |
| 2002/0082856 A1 | * | 6/2002 | Gray | G06F 9/50 718/104 |
| 2005/0188163 A1 | * | 8/2005 | Asthana | G06F 8/62 711/159 |
| 2005/0239494 A1 | * | 10/2005 | Klassen | G06F 8/62 455/550.1 |
| 2006/0184762 A1 | * | 8/2006 | Cobley | G06F 12/0284 711/170 |
| 2008/0126547 A1 | * | 5/2008 | Waldspurger | G06F 9/4881 709/226 |
| 2011/0134738 A1 | * | 6/2011 | Pugsley | G11B 27/034 369/83 |
| 2011/0206342 A1 | * | 8/2011 | Thompson | H04N 5/782 386/200 |
| 2013/0185341 A1 | * | 7/2013 | Rajaram | G06F 3/0608 707/821 |
| 2015/0081978 A1 | * | 3/2015 | Daly | G06F 12/12 711/133 |
| 2015/0373116 A1 | * | 12/2015 | Mo | G06F 3/0608 709/219 |

* cited by examiner

*Primary Examiner* — Gautam Sain
*Assistant Examiner* — Alexander J Yoon
(74) *Attorney, Agent, or Firm* — Dickinson Wright RLLP (57) ABSTRACT

Disclosed herein is a technique for managing storage space in a user device. Users are provided with options to manage storage space usage in an organized and efficient manner. The options can include recommendations to the user regarding automatically and/or manually purging data from the user device to free up a particular amount of storage space that is needed to carry out a particular task.

20 Claims, 10 Drawing Sheets

| SSD | | |
|---|---|---|
| 129.91 GB free of 249.48 GB | | |
| Recommendations | Applications 571.7 MB | |
| Applications 571.7 MB | | Open Applications |
| Documents 1.07 GB | Name | Last Accessed | Size ˅ |
| Books Library 1.99 GB | Application 1 | 4/18/16, 12:58 PM | 32 MB |
| Cloud Storage 2.59 GB | Application 2 | 4/17/16, 11:00 PM | 26 MB |
| OS Files 7.62 GB | Application 3 | 4/16/16, 10:00 AM | 4 MB |
| Media Library 29.1 GB | | | |
| Mail 25.77 GB | | | |
| Web Browser 502 MB | | | |
| Trash 9.77 GB | | | |

*FIG. 3B*

| ooo | SSD 129.91 GB free of 249.48 GB | | |
|---|---|---|---|
| Recommendations | Media Library 29.17GB | | |
| Applications 571.7 MB | | | Open Media Library |
| Documents 1.07 GB | Name | Last Accessed | Size |
| Books Library 1.99 GB | *Music* | | |
| Cloud Storage 2.59 GB | Song 1 | 4/4/16, 4:23PM | 9.8 MB |
| OS Files 7.62 GB | Song 2 | 4/4/16, 4:21PM | 8.6 MB |
| Media Library 29.1 GB | *Movies* | | |
| Mail 25.77 GB | Movie 1 | 4/1/16, 1:33PM | 5.73 GB |
| Web Browser 502 MB | Movie 2 | 3/28/16, 4:32PM | 4.88 GB |
| Trash 9.77 GB | *TV Shows* | | |
| | Show 1 | 3/25/16, 2:37PM | 4.03 GB |
| | Show 2 | 3/24/16, 4:32PM | 1.79 GB |
| | *Podcasts* | | |
| | Podcast 1 | 4/18/16, 12.30PM | 18 MB |
| | Podcast 2 | 3/28/16, 4:30PM | 6.2 GB |

*FIG. 3C*

| ○○○ | SSD | | |
| --- | --- | --- | --- |
| | 129.91 GB free of 249.48 GB | | |
| Recommendations | Books Library 1.99GB | | Open Books Library |
| Applications 571.7 MB | 344 | | |
| Documents 1.07 GB | Name | Last Accessed | Size ˇ |
| Books Library 1.99 GB | ● Book 1 | 3/15/16, 4:23PM | 348 MB |
| Cloud Storage 2.59 GB | ◐ Book 2 | 8/29/15, 4:32PM | 44.6 MB |
| OS Files 7.62 GB | Book 3 | 6/16/13, 1:33PM | 24.9 MB |
| Media Library 29.1 GB | 346 | | |
| Mail 25.77 GB | | | |
| Web Browser 502 MB | | | |
| Trash 9.77 GB | | | |

SYSTEM AND METHOD FOR MANAGING STORAGE SPACE

CROSS-REFERENCE TO RELATED APPLICATION

The present application claims the benefit of U.S. Provisional Application No. 62/348,824, entitled "SYSTEM AND METHOD FOR MANAGING STORAGE SPACE" filed Jun. 10, 2016, the content of which is incorporated herein by reference in its entirety for all purposes.

FIELD

The described embodiments set forth a technique for managing storage space in user devices.

BACKGROUND

Solid-state drives (SSDs) are increasingly being used to provide storage for user devices (e.g., smartphones, tablets, laptops, etc.). Typically, SSDs have lower storage capacity in comparison to hard disk drives (HDDs). As a result, user devices that include SSDs can run out of available storage space as the user loads his/her user device with data over time. Moreover, when the user device runs out of storage space, the user is simply notified of the same without providing options for remedying the situation. In turn, the user must undergo the cumbersome process of navigating through his/her data in an unorganized manner to figure out what can be deleted in order to free up space. Consequently, there is a need for a technique for managing storage space in an efficient, organized, and user-friendly manner.

SUMMARY

Representative embodiments set forth herein disclose various techniques for managing storage space in user devices. In particular, the embodiments set forth various techniques for providing users with options to efficiently manage storage space usage. The options can include recommendations to the user regarding automatically and/or manually purging certain types of data from the user device (e.g., data that can be re-downloaded from a data store) to free up a particular amount of storage space. For example, the user can select an option to free up the particular amount of storage space by automatically deleting data associated with a photo library from the user device and/or moving the data to the data store. In addition, when the desired amount of storage space cannot be made available by automatically purging the certain types of data, the user is provided with options to manually delete particular assets that are presented to the user in an organized manner.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for providing an integrated approach to managing storage space in a user device, where data—also referred to herein as "assets"—can be automatically and/or manually deleted to free up storage space. For example, based on a user's preferences, certain types of data can be automatically deleted to free up a particular amount of storage space in response to a need to store new data at the user device. However, when the particular amount of storage space cannot be made available through automatic deletion, the user can be presented with a storage management interface that enables the user to make informed decisions with respect to manually deleting assets stored in the user device.

Accordingly, the techniques described herein provide a mechanism for managing storage space in user devices. A more detailed discussion of these techniques is set forth below and described in conjunction with FIGS. 1, 2, 3A-3E, and 4-6, which illustrate detailed diagrams of systems and methods that can be used to implement these techniques.

Figure 1:
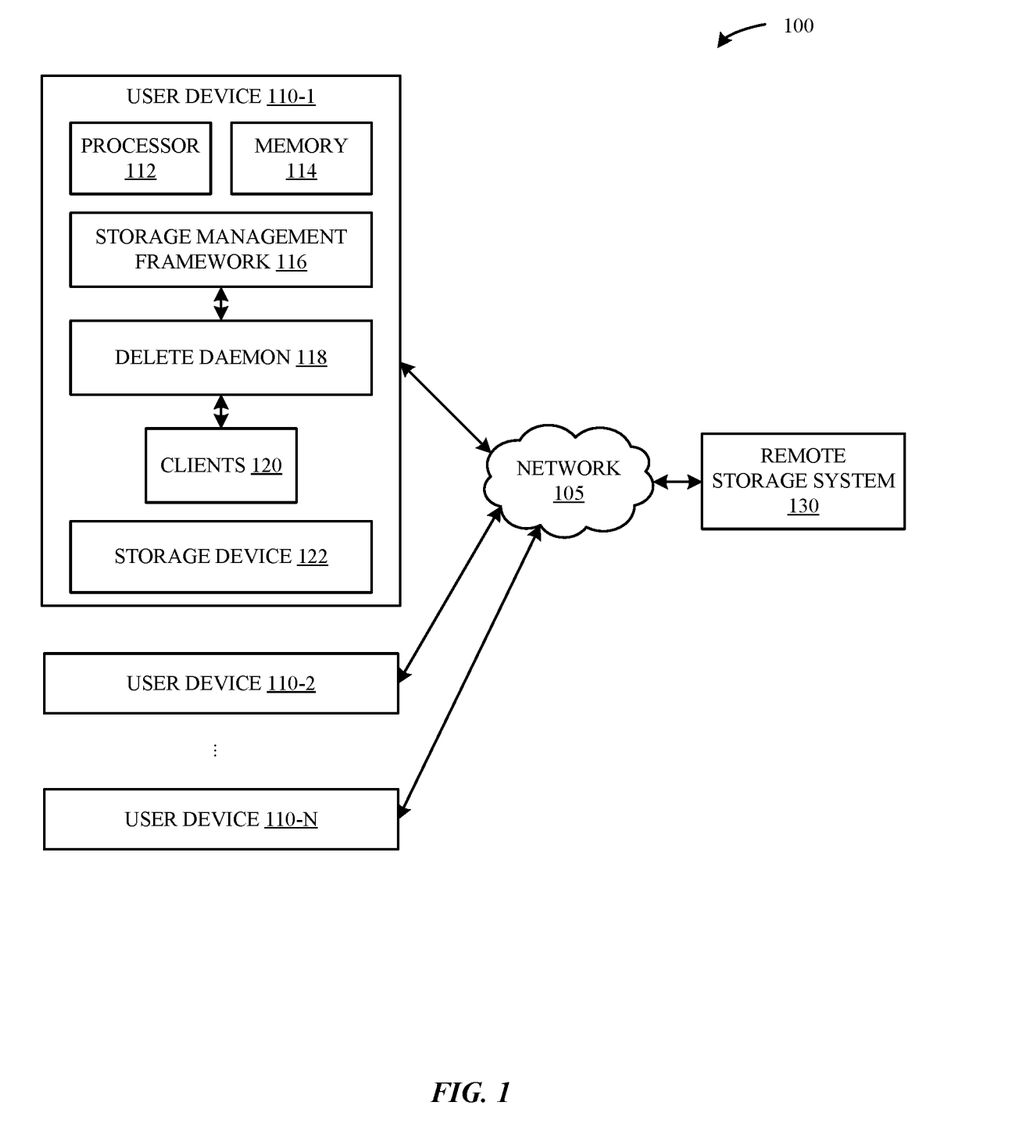
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes user devices 110-1, 110-2, . . . , 110-N (referred to herein as user device(s) 110) and a remote storage system 130. Each user device 110 can represent any type of computing device (e.g., a smartphone device, a tablet device, a laptop device, a desktop computer, and the like). A processor 112, in conjunction with the memory 114, can implement an operating system (OS) that is configured to execute various applications (e.g., native OS applications and user applications), daemons, and other processes/services on the user device 110. The user device 110 can include a storage device 122, which can represent a solid state drive (SSD) or hard disk drive (HDD) storage system. Other storage systems can be used, as will be appreciated.

The remote storage system 130 can include a cloud-based storage system (e.g., iCloud by Apple®) that provides remote storage space to the user device 110 (e.g., to store user's data). In some implementations, the cloud-based storage system enables the user's data to be synchronized across multiple user devices 110 associated with the user (e.g., all user devices 110 that are associated with a same user account). According to some embodiments, the remote storage system 130 can include a media-based storage system (e.g., iTunes by Apple®) that provides content that is re-downloadable. As shown in FIG. 1, the user device 110 can be communicably coupled to the remote storage system 130 via a network 105. The network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

As shown in FIG. 1, the user device 110 can include a storage management framework (SMF) 116, a delete daemon 118, and a number of clients 120. According to some embodiments, the SMF 116 provides an interface between (1) entities (not otherwise illustrated in FIG. 1) that generate requests (referred to herein as "storage space requests") to free up storage space, and (2) the delete daemon 118. The entities can include applications, services, and/or processes that require a particular amount of storage space to be made available in order to execute a task (e.g., OS update process, movie download process, and the like). For example, when the user desires to download a 3 GB movie, the movie download process can generate a request to the SMF 116 indicating that the movie download process requires 3 GB of storage space to proceed with the download. As described in greater detail below, the storage space requests can cause the clients(s) 120 to free up the particular amount of storage space needed by the entities.

As noted above, the SMF 116 can communicate a particular storage space request to the delete daemon 118. According to some embodiments, the delete daemon 118 represents a process that interacts with the client(s) 120 to selectively purge data (e.g., data associated with the client(s) 120) from the user device 110. The client(s) 120 can represent native or resident applications that are installed on the user device 110 and with which the user directly interacts. According to some embodiments, one or more of the client(s) 120 can represent daemons that run as background processes that are not visible to the user of the user device 110. Each client 120 has data (e.g., files or other system data) associated therewith that consumes a particular amount of storage space on the user device 110. The system data can include old log files, a system performance cache, and the like. In some implementations, the delete daemon 118 manages cached data (associated with the client(s) 120) that is stored in the local storage device 122 (e.g., in a cache portion of the local storage device 122). The cached data can represent local copies of the user's data that is stored in the remote storage system 130 and readily recoverable from the remote storage system 130 (e.g., copies of photos associated with a photo library client, copies of music files associated with a media library client, copies of map data associated with a map application, and the like). The cached data can also include other types of data, for example, web data associated with a web browser client, derived data that can be re-created or re-computed at the user device 110, temporary files, and/or other data. In some implementations, the delete daemon 118 interacts with the client(s) 120 to purge the cached data and/or system data.

In some implementations, in response to the storage space request from the SMF 116, the delete daemon 118 determines a target amount of storage space that needs to be freed in order to satisfy the storage space request. For example, continuing with the previous example involving a 3 GB storage space request associated with the movie download process, the delete daemon 118 can determine that 2 GB storage space needs to be freed when the user device 110 only has 1 GB of available storage space. In some implementations, the delete daemon 118 can query each client 120 for an amount of storage space that the respective client 120 can make available (by deleting a portion of its own data and/or by moving a portion of its data to the remote storage system 130). In turn, each client 120 responds to the query to indicate an amount of storage space the respective client 120 can make available. For example, a first client 120 can respond indicating that it can free up 1.5 GB of storage space and a second client 120 can respond indicating that it can free up 0.5 GB of storage space. When the responses from the client(s) 120 indicate that the target amount of storage space can be made available (i.e., freed), the delete daemon 118 issues requests (referred to herein as "purge requests") to the first client 120 and the second client 120 to carry out the necessary actions to make the aforementioned amounts of storage space available. In other words, delete daemon 118 communicates a first purge request to the first client 120 to free up 1.5 GB storage space and a second purge request to the second client 120 to free up 0.5 GB of storage space. When the target amount of storage space has been freed—that is, the first client 120 and the second client 120 have freed the aforementioned space and provided a completion indication to the delete daemon 118—the delete daemon 118 communicates a response to the SMF 116 indicating that the desired amount of storage space (i.e., 3 GB in total—2 GB from the client(s) 120, and 1 GB of existing free storage space) is available for the movie download process. In turn, the SMF 116 communicates the response to the movie download process and the movie download can be performed.

According to some implementations, the delete daemon 118 is configured to communicate the purge requests with assigned urgency levels that each represent a commensurate demand to the client 120 to free up space. For instance, at a first urgency level, the client(s) 120 can free up some amount of storage space in accordance with a target amount of storage space specified in a purge request. If the target amount of storage space is not freed, the purge request can be re-communicated by the delete daemon 118 at a second urgency level (e.g., higher than the first urgency level). At the second urgency level, the client(s) 120 can be more aggressive in deleting their data to free up storage space. For example, the client(s) 120 can identify data that has not been accessed within a threshold amount of time and target those that data for deletion or for migration to remote storage system 130. If the target amount of storage space is still not freed, the purge requests can be communicated by the delete daemon 118 at a third urgency level (higher than the first and second urgency levels) where the client(s) 120 are required to free up all storage space in accordance with the target amount of storage space. Accordingly, the client(s) 120 manage data deletion differently based on the urgency levels associated with purge requests, and it can be appreciated that any number or scheme of urgency levels can be implemented.

According to one embodiment, the delete daemon 118 and the client(s) 120 implement a plugin-based approach. Each client 120 can be added and supported via a plugin that can 1) receive requests from the delete daemon 118, 2) respond to the requests, and 3) indicate to the delete daemon 118 the amount of storage space it has freed. In particular, each client 120 can provide, via the plugin, recommendations regarding the amount of storage space the client 120 can free up (e.g., by deleting its respective data). It is noted that this plugin-based approach is exemplary and other approaches can be used without departing from the scope of this disclosure.

Figure 2:
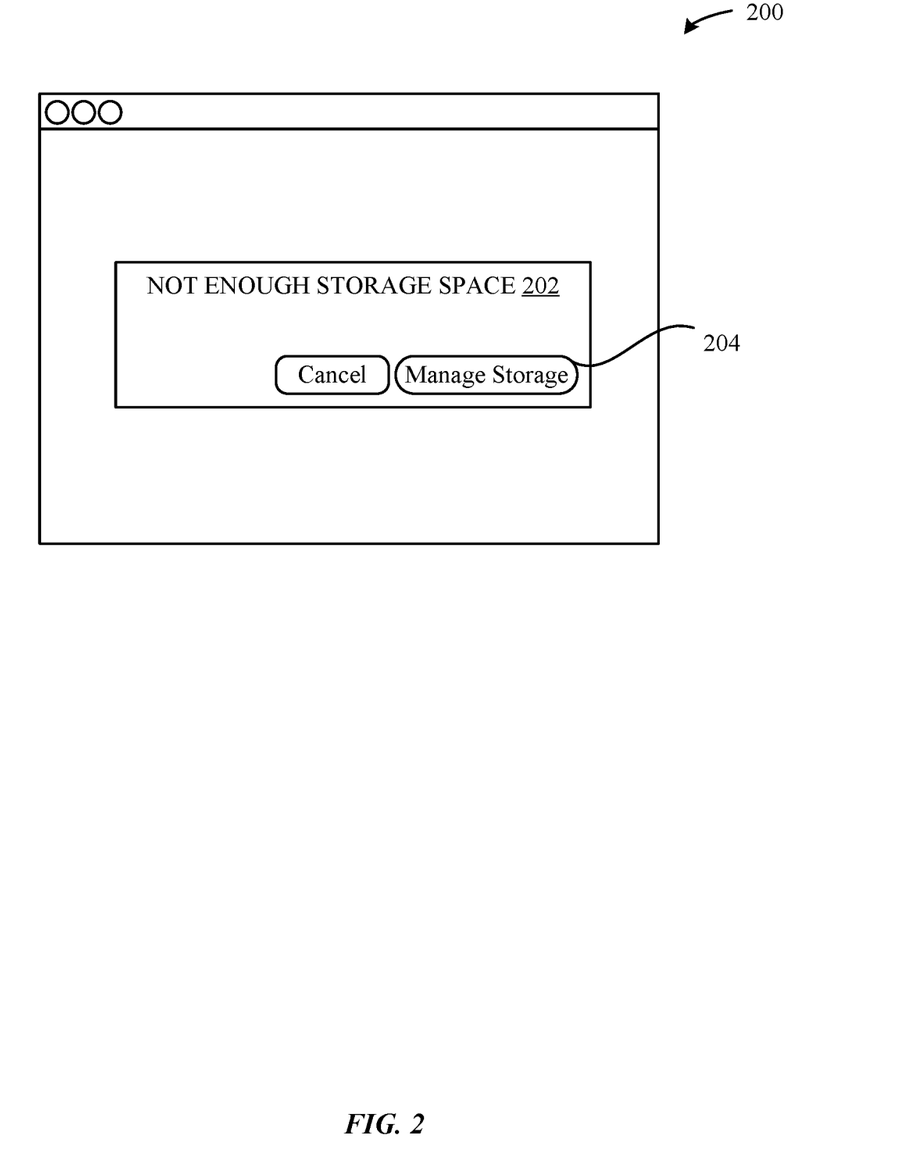
FIG. 2 illustrates a conceptual diagram of an example graphical user interface presented at the user device of FIG. 1, according to some embodiments.

In some implementations, when the target amount of storage space cannot be made available (i.e., the client(s) 120 individually or together cannot free up the target amount of storage space), the delete daemon 118 communicates the response to the SMF 116 indicating that the target amount of storage space is not available. In turn, the SMF 116 communicates the response to the entity (e.g., the movie download process) indicating the unavailability of storage space. In addition, the SMF 116 can be configured to generate a notification to the user indicating that the movie download cannot be performed because there is not enough storage space. See, for example, FIG. 2, where a notification 202 is presented within a graphical user interface (GUI) 200. As shown in FIG. 2 the notification 202 can be in the form of a pop-up window, a banner, or any other interface element. As shown in FIG. 2, the notification 202 presents a "Manage Storage" selectable option/icon 204 to the user. When the user selects option 204, the SMF 116 can generate a storage management interface, e.g., the storage management interface 300 depicted in FIG. 3A and described below in greater detail. In some implementations, upon selection of the "Manage Storage" icon 204, the SMF 116 provides the user with access to the storage management interface via a storage management application resident on the user device 110.

Figure 3A:
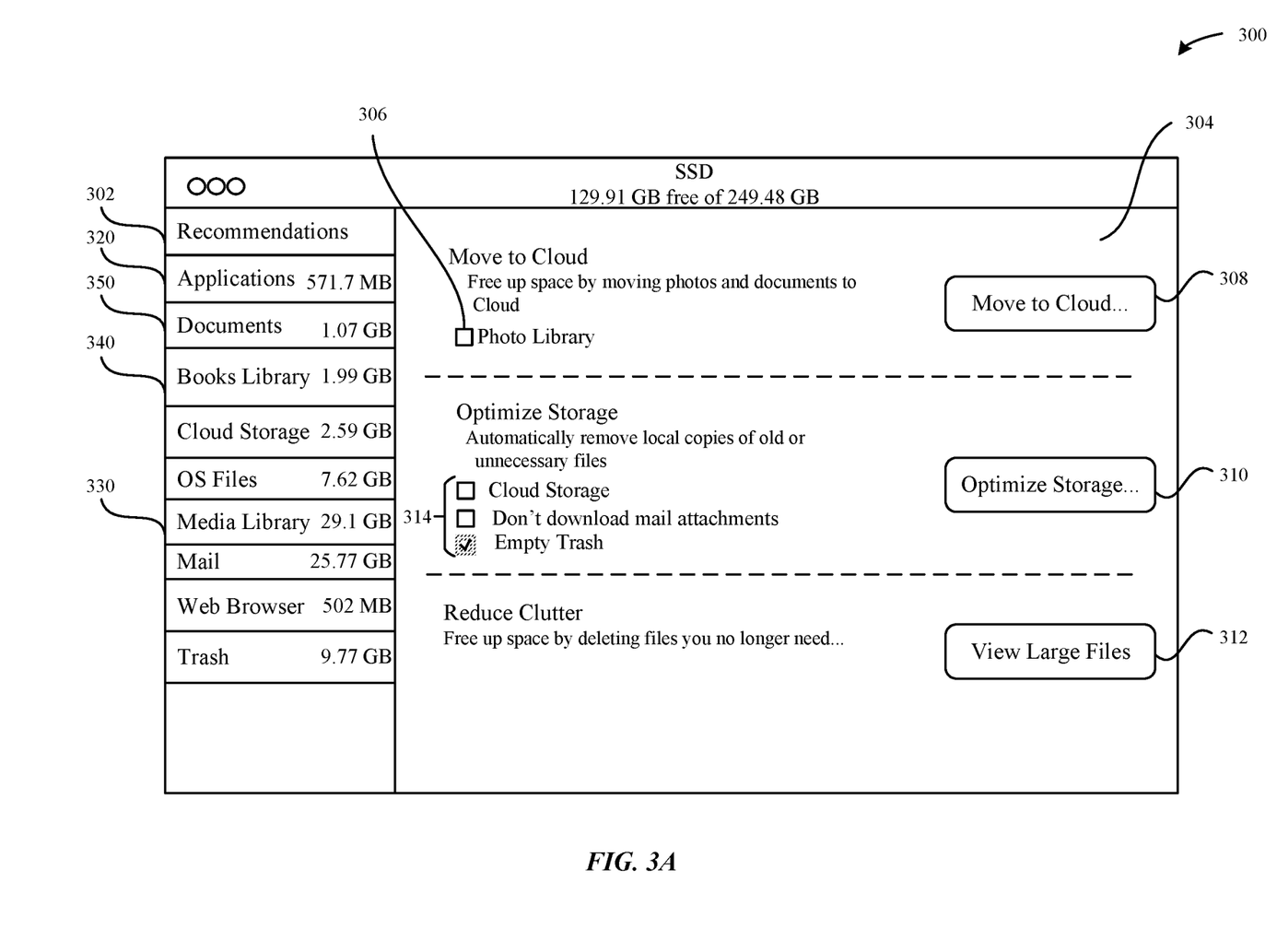
FIGS. 3A-3E illustrate conceptual diagrams of example graphical user interfaces that enable a user to provide selections at the user device of FIG. 1, according to one embodiment.

As shown in FIG. 3A, the storage management interface (SMI) 300 presents various options and preferences to the user for purposes of managing storage space usage. In particular, FIG. 3A depicts a recommendations view 304 that presents selectable options/preferences to the user of the user device 110. The recommendations view 304 can be presented as a default view or when the recommendations icon 302 is selected. The configuration options in the recommendations view 304 allow the user to make selections/decisions about whether the user wants certain types of user data/files to be automatically purged. For example, the user data can be automatically purged (i) on a regular basis, (ii) when the storage space falls below a certain threshold level, or (iii) when additional storage space is needed to satisfy a storage space request. The user data can include files, documents, or other data that is stored in the local storage device 122 of the user device 110. The user data can be automatically purged by either deleting the user's files/documents or by moving the user's files/documents to the remote storage system 130. For example, when the user selects the checkbox 306 for the "photo library" option/preference and selects the "move to cloud" button 308, the SMF 116 receives an indication that the photos associated with the photo library should be automatically moved to the remote storage system 130, e.g., in the event that additional storage space needs to be freed. In some implementations, the SMF 116 can indicate to the delete daemon 118 that the user has opted to free up storage space by moving photos from the photo library to the remote storage system 130. The delete daemon 118 can accordingly purge the photos to make the additional storage space available (e.g., on a regular basis or in response to storage space requests).

In some implementations, the user is presented with various options for optimizing storage space by allowing automatic removal of local copies of old, unnecessary, duplicate, or re-downloadable files (i.e., files that can be re-downloaded from the remote storage system 130). For example, by selecting an "empty trash" optimizing check box 314 and the "optimize storage" button 310, the SMF 116 receives an indication that the user wants files in the trash folder to be automatically deleted when additional storage space needs to be freed or on a regular basis (e.g., every 30 days). Also, selection of the "cloud storage" optimizing check box 314 can cause copies of old files (e.g., files that have not been accessed for a particular amount of time) to be automatically removed from the user device 110 as these files can be re-downloaded from the remote storage system 130 as needed. In some implementations, when the "cloud storage" optimizing check box 314 is selected, only files/documents that are actively being used by the user are downloaded to the user device 110 and any old files are removed from the local storage device 122 and/or transferred to the remote storage system 130. In other words, the delete daemon 118 can remove/purge files based on a last-accessed date associated with the files.

Other criteria for optimizing storage, instead of or in addition to the last-accessed date, can be utilized. The user's usage patterns (e.g., times of day or days of the week that the user accesses a particular file(s), etc.) can be utilized as criteria for optimizing storage. For example, when it is known, based on the usage pattern, that the user uses a particular file or file type on a particular day of the week, the particular file can be automatically downloaded from the remote storage system 130 (if unavailable at the user device 110) and an old file can be automatically removed from the user device 110 to make space for the particular file (when enough space is not available at the user device 110). Importance tags—e.g., labels used by the user to tag files as very important, less important, or optional—also can be utilized as criteria for optimizing storage. For example, any files that are tagged as less important or optional are automatically removed from the user device 110 to make storage space available. Other criteria, for example, environmental conditions, such as a current or continuous location of the user device 110, network connectivity conditions, and/or bandwidth availability can also be taken into account when optimizing storage.

Accordingly, based on a user's selections, the SMF 116 can initiate automatic deletion or automatic transfer of files/documents when storage space is needed. In some implementations, when storage space is needed, the delete daemon 118 can purge data based on the user preferences. For example, when the "photo library" client 120 receives a request (from the delete daemon 118) to free up space, the "photo library" client 120 can automatically move photos to the remote storage system 130 when the check box 306 is selected. While the recommendations view 304 depicts a single option to automatically move photos to the remote storage system 130, it will be appreciated that the disclosure is not so limited and other options may be provided as well. For example, a second option to automatically move music files from a media library to the remote storage system 130 can also be provided.

In some implementations, the user is also presented with an option to manually delete any files that the user no longer needs. In particular, the user can choose to view large files that consume large amounts of storage space by selecting the "view large files" button 312. The user can then manually delete any large files that are not needed. In some implementations, the files can be grouped based on the age of the files and each group can be sorted based on sizes of the files in the group. Grouping and sorting of files in this manner enables the user to more easily locate old files that likely are no longer needed.

Figure 3B:
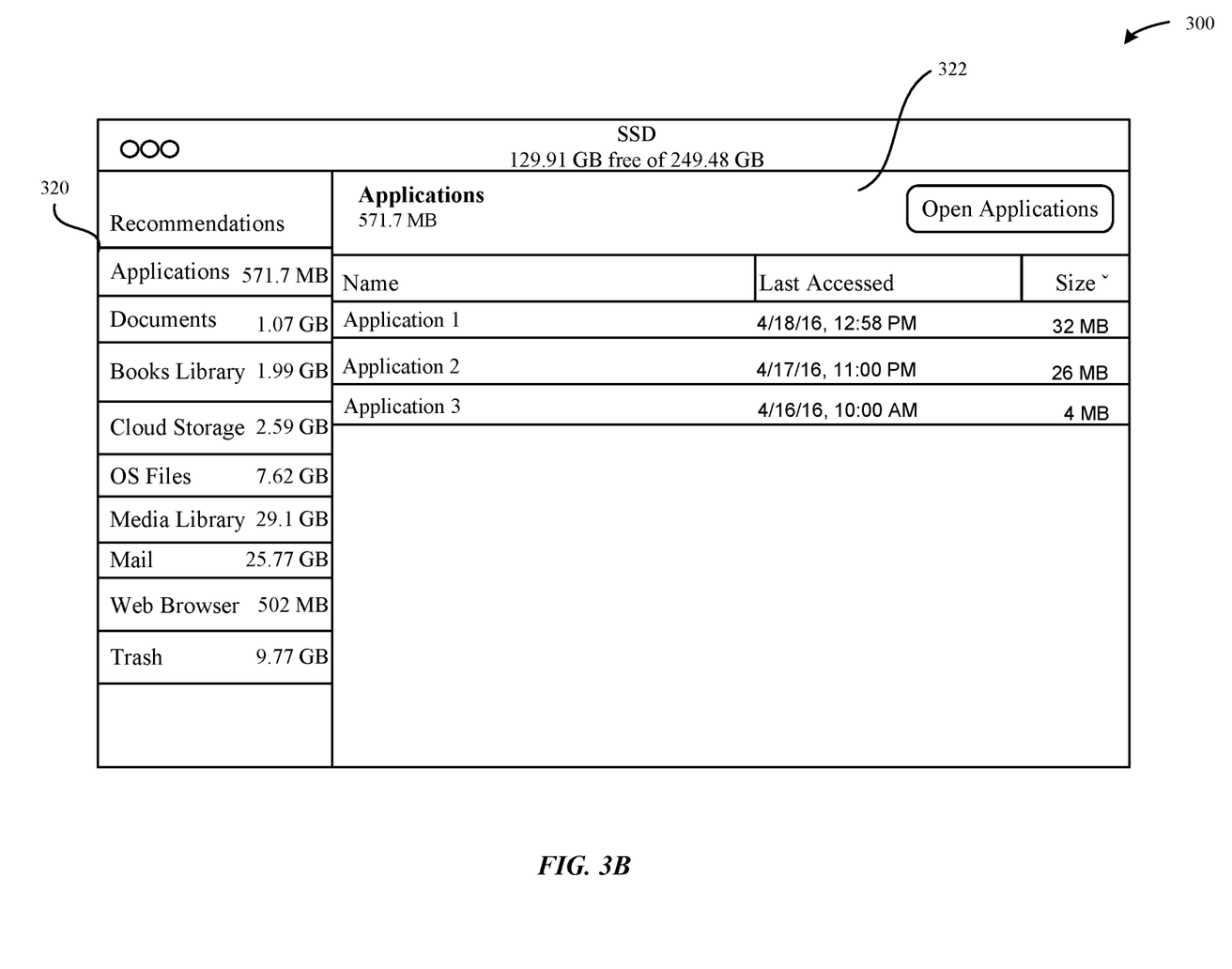
Figure 3C:
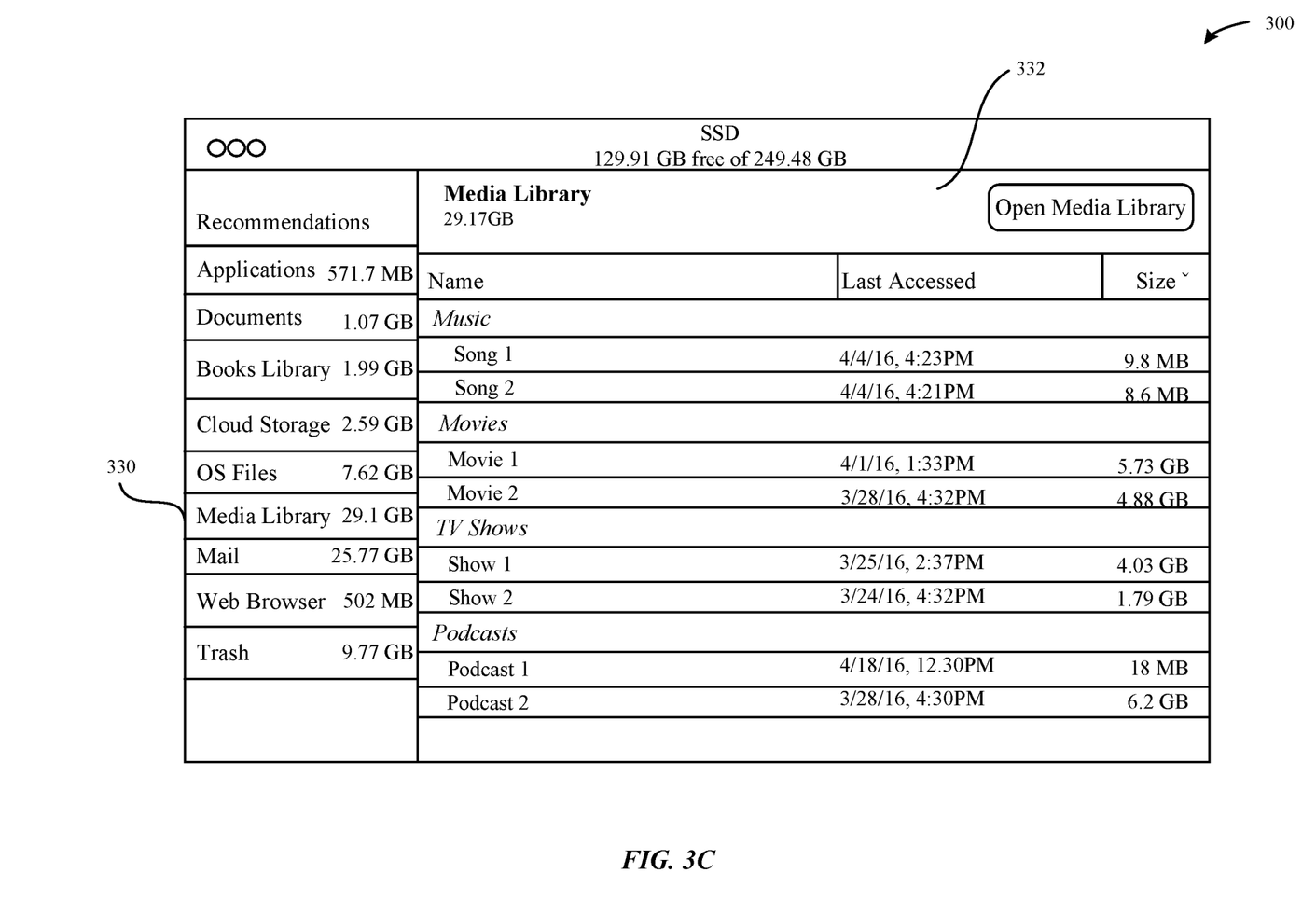
Figure 3D:
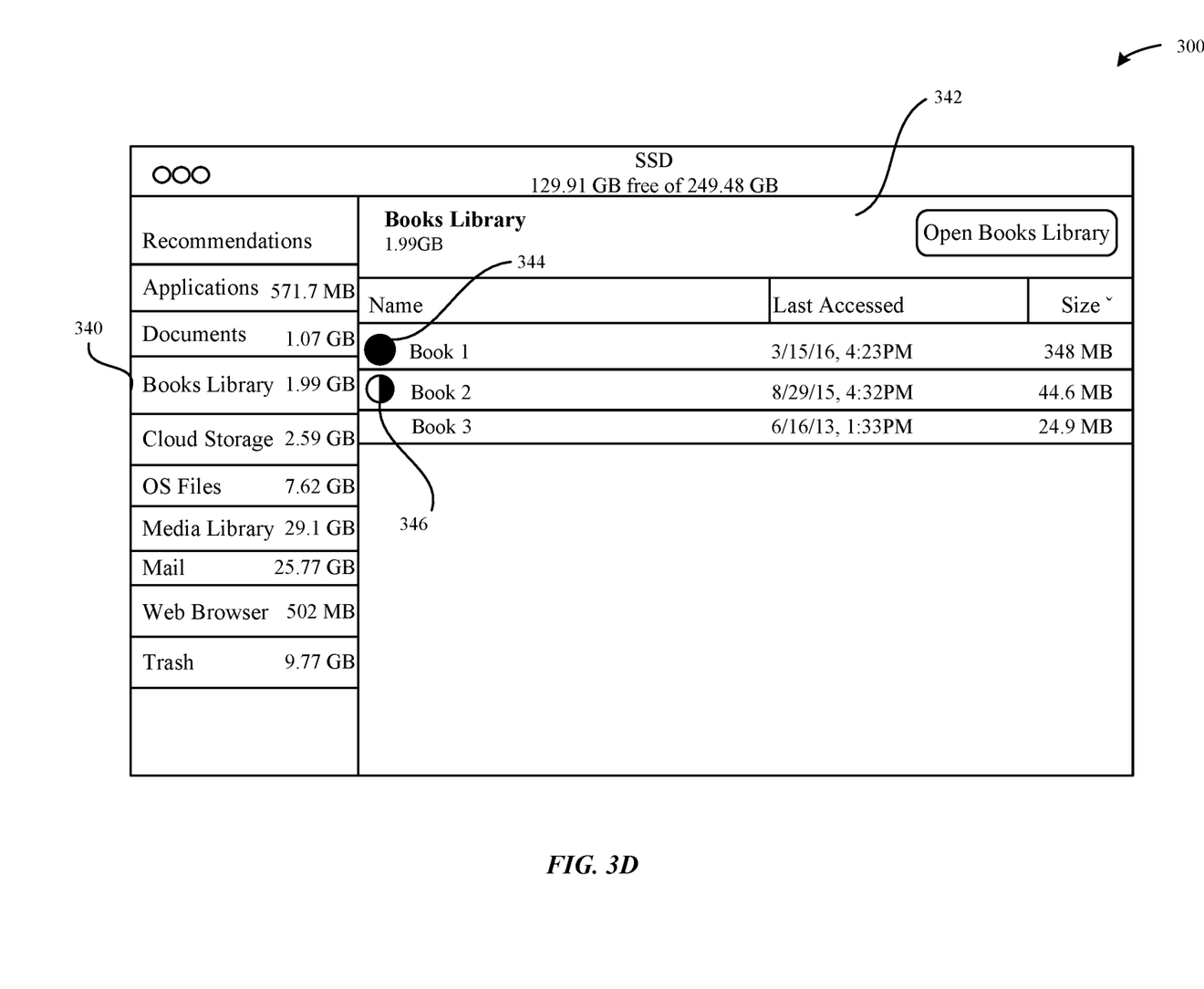

In addition, the SMI 300 allows the user to manually delete data associated with various entities such as, applications, documents, books, music files, movies, OS files, emails, and/or any other forms of user data or system data, in order to free up storage space. For example, as depicted in FIG. 3B, selection of "Applications" icon 320 causes an applications view 322 to be presented to the user via the SMI 300. The applications view 322 displays a list of applications that can be purged from the user device 110. The list of applications can include applications that can be re-downloaded from the remote storage system 130, applications that have not been used by the user for a threshold amount of time, and/or other applications. In some embodiments, the applications can be sorted based on the last accessed dates associated with the applications. The user can opt to delete any application(s) from the list to make storage space available. Similarly, as depicted in FIG. 3C, selection of a "media library" icon 330 causes a media library view 332 to be presented to the user via the SMI 300. The media library view 332 displays a list of different types of assets (e.g., music, movies, TV shows, Podcasts, etc.) that can be purged from the user device 110. Each list is sorted based on the last accessed date and includes assets that can be re-downloaded from the remote storage system 130 or that have not been used by the user for a threshold amount of time. In a similar manner, as depicted in FIG. 3D, selection of "books library" icon 340 causes a books library view 342 to be presented to the user via the SMI 300. The books library view 342 displays a list of books that can be purged from the user device 110. The list is sorted based on the last accessed date and includes books that can be re-downloaded from the remote storage system 130 or that have not been used by the user for a threshold amount of time. In some implementations, the user can be provided with an indication regarding whether the book has been completely read (indicated by symbol 344) or partially read (indicated by symbol 346). Based on the information gathered from the books library view 342, the user can choose to delete a particular book from the list of books. For example, the user can choose to delete book 1 because it consumes maximum amount of storage space and it has already been read by the user. In addition, the user can also choose to delete book 3, even though he/she has not read it, because the user has no intention of reading the old book. In some implementations, although not illustrated in FIG. 3C, symbols indicating whether the various media assets have been completely or partially listened to/watched can be provided in a manner similar to the symbols 344 and 346 of FIG. 3D.

Figure 3E:
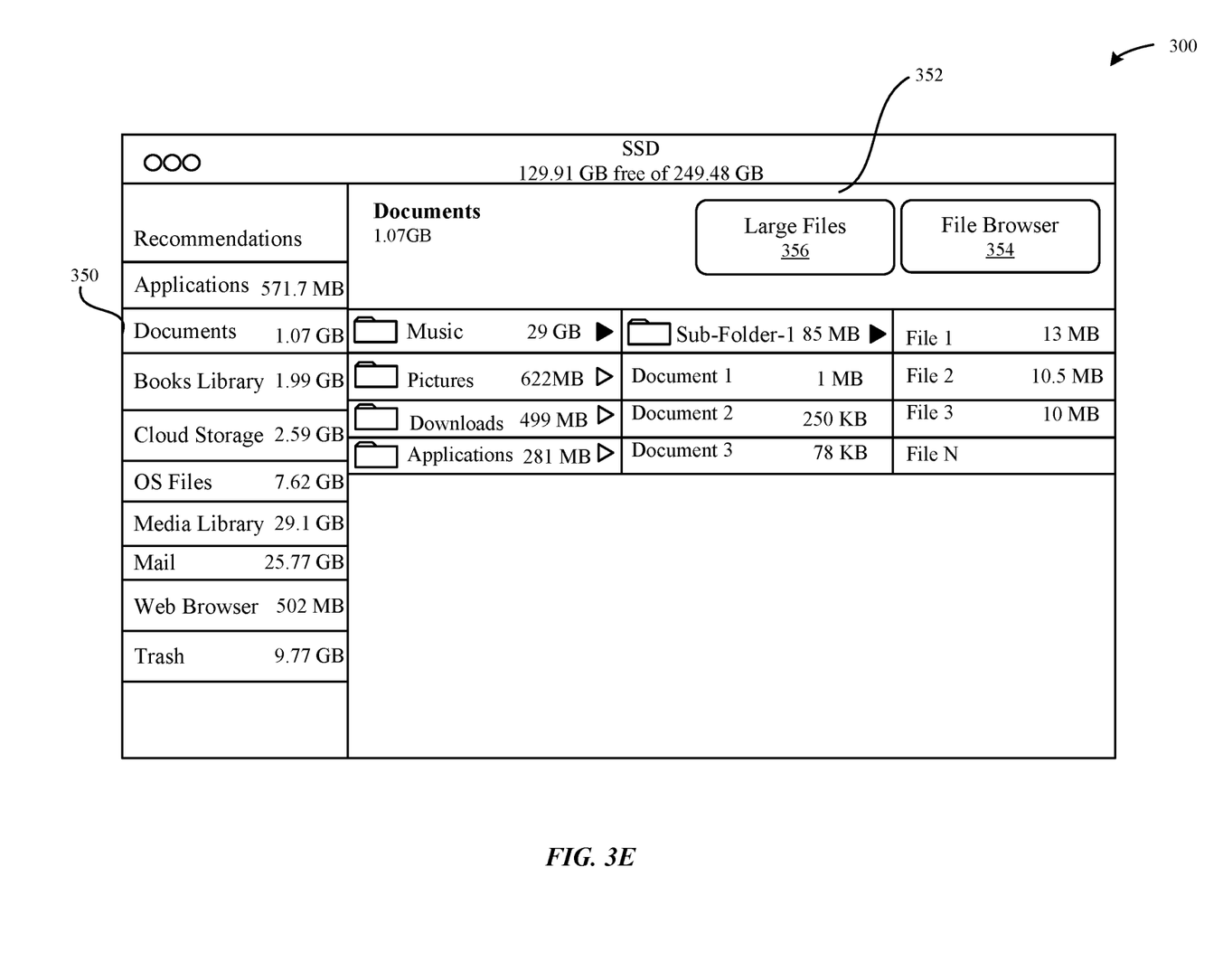

As shown in FIG. 3E, when the user selects "documents" icon 350, a list of documents can be presented to the user. The user can choose (via selection of icon 354) to view the documents in a browser view 352. The browser view 352 allows the user to view/select folder(s) and view/select sub-folder(s) and documents/files in the folder(s)/sub-folder (s). For example, FIG. 3E shows the user has selected the music folder, and sub-folder-1 within the music folder that causes a list of files 1-$n$ to be presented. The folder(s)/sub-folder(s)/files are sorted based on size that allows the user to navigate and make an informed decision regarding deleting a particular folder/sub-folder/file. Although not illustrated in FIG. 3E, upon selection of icon 356, a list of large documents/files is presented to the user, where the list is sorted according to size of the document/files (but can also be sorted in accordance with other properties).

Although FIGS. 3A-3E depict various options/preferences provided to the user for purposes of managing storage space, it is noted that these options/preferences are exemplary and other options/preferences can be provided as well without departing from the scope of this disclosure. For example, options can be included to manage/optimize storage space by: deleting or not downloading any duplicate files, not storing mail attachments in different formats, deleting installer packages associated with an application after the application is installed, removing copies of watched TV shows or movies from the media library, and the like. Also, while interfaces for applications, documents, books library, and media library are depicted in FIGS. 3A-3E, similar interfaces can be generated/presented for other entities as well, for example, cloud storage, OS files, mail, web browser, trash, and the like. Furthermore, the entities depicted in FIGS. 3A-3E are exemplary, and any number of entities that consume storage space in the user device 110 can be included in the SMI 300 as will be appreciated.

In some implementations, the notification 202 and the SMI 300 are generated and/or presented to the user when the free or available storage space in the local storage device 122 falls below a particular threshold level. In some implementations, when the storage space in the local storage device 122 (e.g., SSD) falls below a first threshold level, the SMF 116 triggers the delete daemon 118 to purge a particular amount of data at a particular urgency level (e.g., a first urgency level indicating a moderate priority). In turn, the delete daemon 118 triggers the client(s) 120 to free up storage space by purging the particular amount of data in order to make the available storage space fall within a desired range (e.g., above the first threshold level). In some implementations, when the storage space in the SSD falls below a second threshold level (lower than the first threshold level), the SMF 116 triggers the delete daemon 118 to purge the particular amount of data at a second urgency level (e.g., a second urgency level indicating a higher priority than the first urgency level). In either scenario, when the particular amount of data cannot be automatically purged, the SMF 116 may display the SMI 300 to allow the user to manually delete the particular amount of data. In these cases, the client(s) 120 may not automatically purge any data, but, the SMI 300 may be displayed to allow the user to manually delete data.

Figure 4:
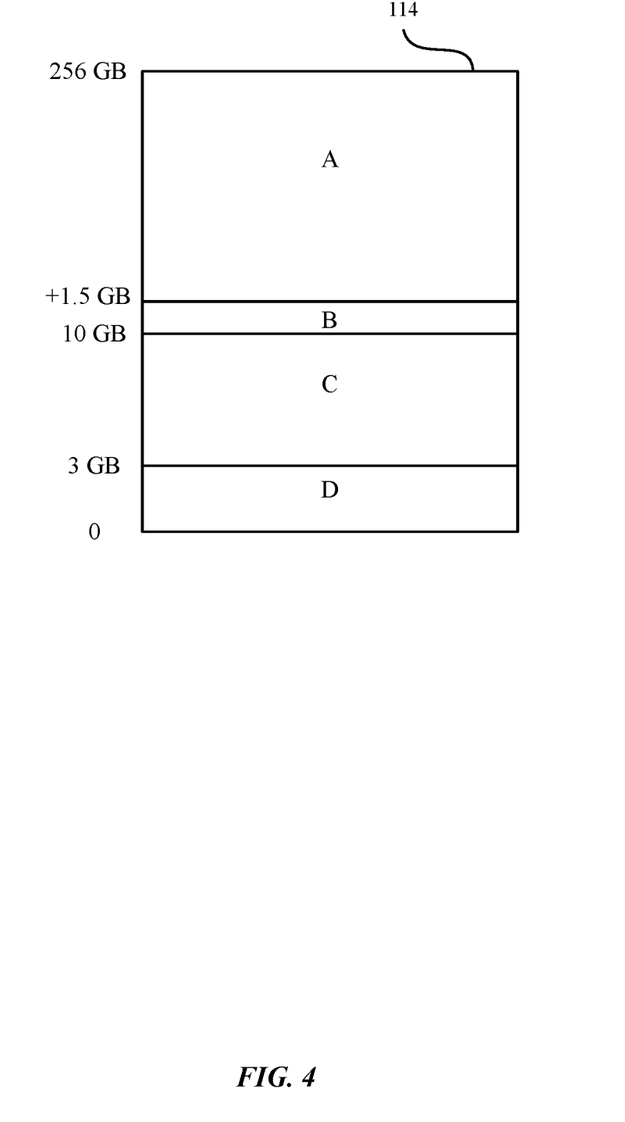
FIG. 4 illustrates a conceptual diagram of exemplary storage space thresholds used at the user device of FIG. 1, according to one embodiment.

FIG. 4 illustrates various exemplary storage space thresholds for the local storage device 122 (e.g., SSD). As shown in FIG. 4, when the available storage space falls within region A (i.e., between 11.5 GB to 256 GB), the data can be freely downloaded and consumed. When the available storage space falls within region C (i.e., between 10 GB to 3 GB) or below a threshold level of 10 GB, the SMF 116 triggers the delete daemon 118 to purge data at the first urgency level. In this scenario, data can be downloaded; however, an equal amount of data is also purged from the SSD so that the amount of available storage space is not significantly changed. It is noted that the threshold level of 10 GB is exemplary, and that other threshold levels can be utilized, e.g., two percent of a total volume size associated with the SSD. In one example, when the available storage space falls within region D (i.e., between 3 GB and 0 GB) or below a threshold level of 3 GB, the SMF 116 triggers the delete daemon 118 to purge data at the second urgency level. In this scenario, additional data is not downloaded and data is purged from the SSD. In either scenario, the goal is to bring the available storage space to fall within a desired range (e.g., of 1.5 GB above 10 GB, i.e., region B in FIG. 4). It is noted that the threshold levels depicted in FIG. 4 are exemplary and other threshold levels can be utilized without departing from the scope of the disclosure.

Figure 5:
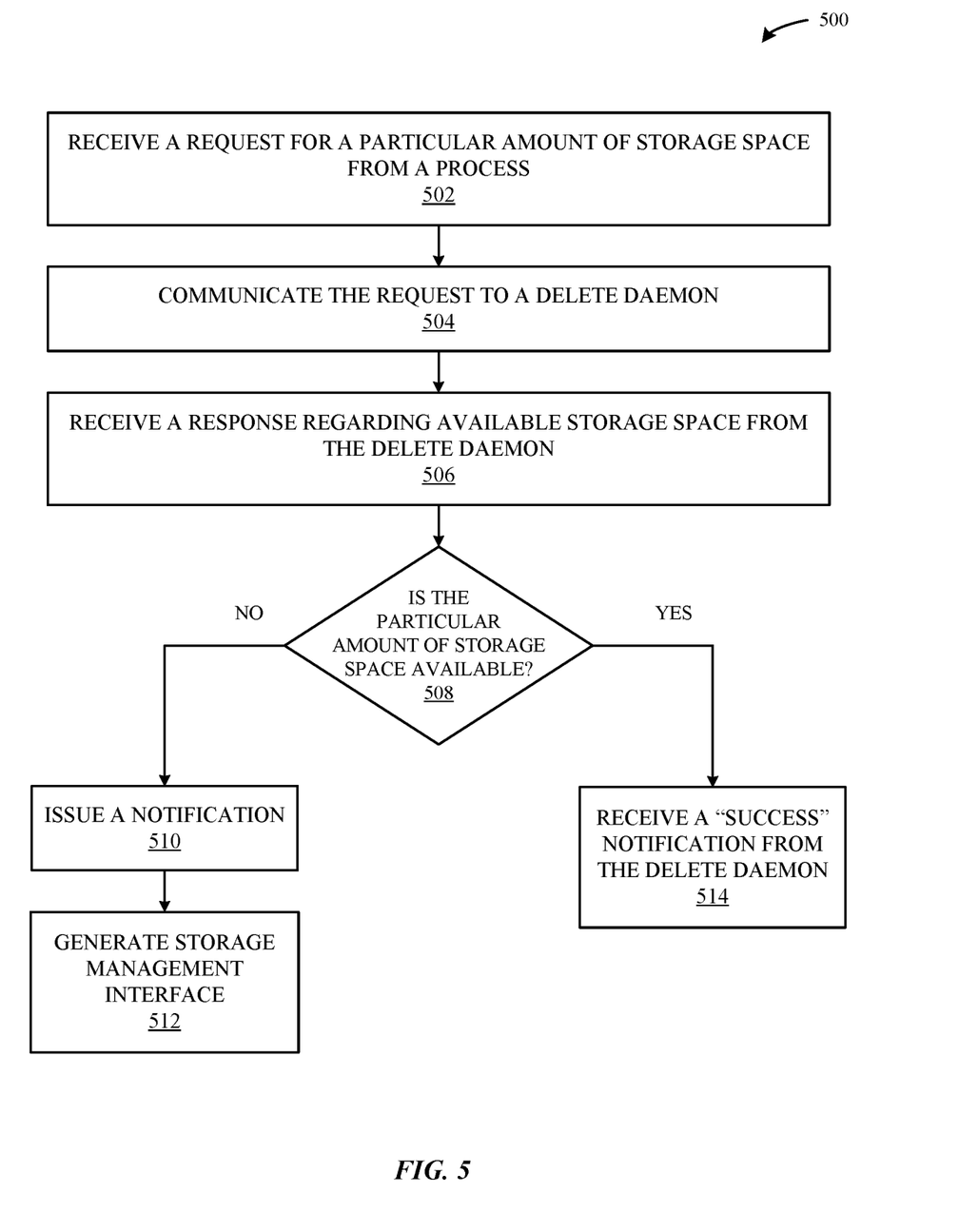
FIG. 5 illustrates a method that is carried out at the user device of FIG. 1, according to one embodiment.

FIG. 5 illustrates a method 500 that is carried out by the user device 110 of FIG. 1, according to one embodiment. In particular, method 500 can be carried out by the SMF 116 operating at the user device 110. As shown in FIG. 5, the method 500 begins at step 502, where the SMF 116 receives a request for a particular amount of storage space (e.g., a storage space request) from a process or an application (for example, the movie download process previously described herein). In some implementations, the storage space request can indicate the particular amount of storage space needed (e.g., 3 GB). In some implementations, the storage space request can indicate an urgency level associated with the request. The urgency level is based on the task to be performed by the process/application. For example, a request for a movie download may be associated with a lower urgency level than a request for a critical security update.

At step 504, the SMF 116 communicates the request to the delete daemon 118, where, in turn, the delete daemon 118 triggers a process for automatic deletion of data to free up storage space. In particular, and in response to the request, the delete daemon 118 determines a target amount of storage space that needs to be made available to satisfy the request. Next, the delete daemon 118 queries the client(s) 120 regarding an amount of storage space that the client(s) 120 can make available. At step 506, the SMF 116 receives a response from the delete daemon 118 regarding available storage space. For example, when the target amount of storage space that can be freed (i.e., the client(s) 120 collectively can make the target amount of storage space available), then the delete daemon 118 communicates a response to the SMF 116 that the particular amount of storage space requested can be made available. On the other hand, when the target amount of storage space cannot be freed (i.e., the client(s) 120 collectively cannot make the target amount of storage space available), then the delete daemon 118 communicates a response to the SMF 116 that the particular amount of storage space requested cannot be made available.

At step 508, the SMF 116 determines whether the particular amount of storage space requested by the application or process is available based on the response from the delete daemon 118. When the particular amount of storage space is available or can be made available, (i) the delete daemon 118 communicates the purge requests to the client(s) 120 (e.g., in a round robin fashion at the urgency level included in the storage space request) and causes automatic deletion to take place to make the target amount of storage space available, and (ii) upon successful completion of the deletion process, the delete daemon 118 provides a "success" notification to the SMF 116, at step 514. In some implementations, the SMF 116 can notify the application or process regarding the availability of the storage space. In turn the application or process can carry out the task for which the storage space was needed. For example, the movie download process can commence downloading the desired movie in response to the notification.

However, when the particular amount of storage space is unavailable or cannot be made available, the application or process can be notified (at step 510) regarding the unavailability of the storage space. For example, the notification 202 shown in FIG. 2 can be generated indicating that there is not enough storage to carry out the task. In some implementations, the notification 202 can include an indication of an actual amount of storage space that is needed. For example, when (1) 3 GB of storage space is requested by the application or process, (2) only 0.5 GB of free space is available in the local storage device 122, and (3) 1.5 GB of storage space can be made available via the delete daemon 118, the application or process can be notified (e.g., via a notification 202) of the actual amount of storage space that is needed (i.e., 1 GB: 3 GB–0.5 GB–1.5 GB). Thus, the user is made aware of how much storage space may need to be manually deleted (in addition to the automatic deletion performed by the delete daemon 118).

At step 512, the SMF 116 can generate the SMI 300 in response to a determination that the particular amount of storage space is unavailable. In some implementations, the SMI 300 is generated/displayed in response to the selection of the "manage storage" icon 204 in the notification 202. In this scenario, selection of the "manage storage" icon 204 causes a storage management application to be initiated that generates and presents the SMI 300. The SMI 300 allows the user to select preferences regarding techniques that can be used to make storage space available (for example, via the recommendations view 304 depicted in FIG. 3A) for the current storage space request and/or any future storage space requests. The techniques included in view 304 are recommended to the user by the SMF 116. The SMI 300 provides a single integrated interface that includes information associated with various entities (e.g., applications, documents, books library, media library, mail, OS files, etc.) that consume space within the user device 110. The user may be provided with the information regarding what types of entities and their associated data can be deleted. For example, the SMI 300 provides the user with listings of applications, documents, files, etc., that can be safely purged from the user device 110 without severely impacting the performance of the user device 110. In some implementations, the listings are sorted based on last accessed date, size, and/or other criteria, which allows the user to make intelligent decisions regarding purging the data. For example, the user may be informed that a particular application consumes 10 GB of storage space and that the user has not used the particular application for a particular period of time (for example, 3 years). The user may be provided with an option to delete the application (or to move some or all of the application's data to the remote storage system 130) to make space available.

According to some embodiments, user data associated with various clients 120 can be moved to the remote storage system 130 (e.g., periodically or when the available storage space falls below a certain threshold level) regardless of the need for the particular amount of storage space. In some implementations, local copies of the user data that are moved to the remote storage system 130 can be stored in the cache portion of the local storage device 122. In some implementations, when space is needed (e.g., in response to a storage space request), the local copies are purged from the local storage device 122 to make the needed space available (e.g., by the delete daemon 118).

Figure 6:
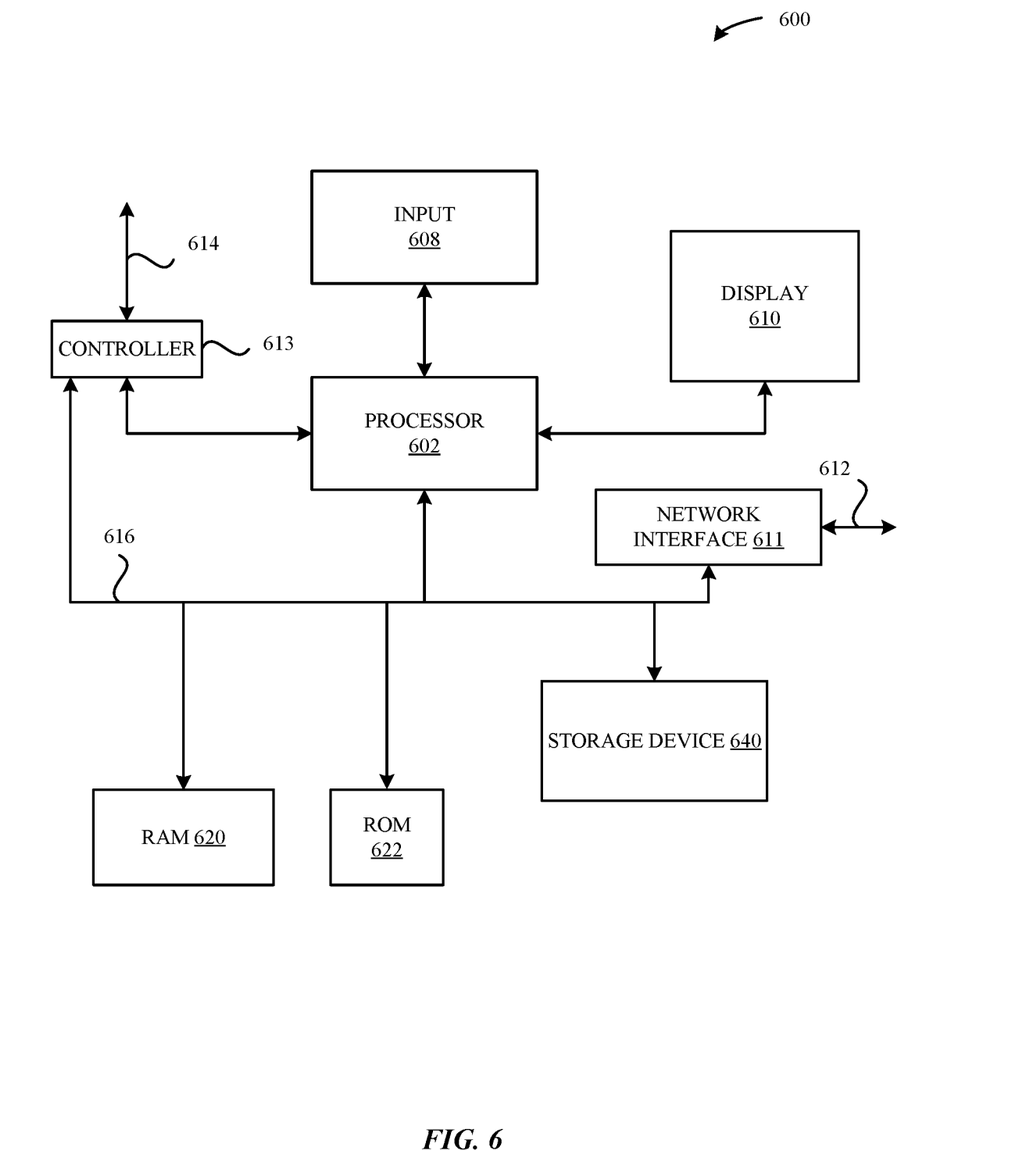
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the user device 110 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing available storage space on a computing device, the method comprising, by a delete daemon executing on the computing device: receiving, for each application of a plurality of applications installed on the computing device, a respective and specific asset deletion action to be performed by the application to make a first amount of storage space associated with application available when the application receives an asset deletion request from the delete daemon; receiving a request to store at least one asset on a storage device that is communicably coupled to the computing device, wherein the request specifies a second amount of storage space that is required to store the at least one asset; in response to determining that the amount of storage space is not available on the storage device, and, for each application of the plurality of applications: issuing, to each application, the asset deletion request to cause each application to perform the respective and specific asset deletion action; and in response to determining that the issued asset deletion request has caused the second amount of storage space to be made available: causing the at least one asset to be stored on the storage device.

2. The method of claim 1, wherein, for each application, the respective and specific asset deletion action is selected by a user by way of a user interface presented on a display device that is communicably coupled to the computing device.

3. The method of claim 2, wherein the respective and specific asset deletion action comprises: copying at least one asset to a remote storage service that is accessible to the computing device.

4. The method of claim 3, wherein the respective and specific asset deletion action further comprises: deleting the at least one asset from the storage device.

5. The method of claim 1, further comprising, in response to determining that the issued asset deletion request has not caused the second amount of storage space to be made available: displaying a user interface that identifies particular assets associated with at least some of the plurality of applications that can be deleted to free the second amount of storage space required to store the at least one asset.

6. The method of claim 1, wherein each application of the plurality of applications is configured to prioritize each asset of one or more assets for deletion based on one or more of the following:
   whether the asset can be derived from asset on the storage device,
   a last access date associated with the asset,
   a size associated with the asset,
   a consumption level associated with the asset,
   whether the asset is a duplicate asset,
   whether the asset is included in a trash folder,
   an importance value associated with the asset, or
   contextual conditions associated with the computing device.

7. The method of claim 1, wherein the issued asset deletion request is assigned an urgency level that controls how each application deletes assets.

8. A computing device configured to manage available storage space on the computing device, the computing device comprising: at least one processor; and at least one memory storing instructions that, when executed by the at least one processor, cause the computing device to implement a delete daemon configured to carry out steps that include: receiving, for each application of a plurality of applications installed on the computing device, a respective and specific asset deletion action to be performed by the application to make a first amount of storage space associated with application available when the application receives an asset deletion request from the delete daemon; receiving a request to store at least one asset on a storage device that is communicably coupled to the computing device, wherein the request specifies a second amount of storage space that is required to store the at least one asset; in response to determining that the amount of storage space is not available on the storage device, and, for each application of the plurality of applications: issuing, to each application, the asset deletion request to cause each application to perform the respective and specific asset deletion action; and in response to determining that the issued asset deletion request has caused the second amount of storage space to be made available: causing the at least one asset to be stored on the storage device.

9. The computing device of claim 8, wherein, for each application, the respective and specific asset deletion action is selected by a user by way of a user interface presented on a display device that is communicably coupled to the computing device.

10. The computing device of claim 9, wherein the respective and specific asset deletion action comprises: copying at least one asset to a remote storage service that is accessible to the computing device.

11. The computing device of claim 10, wherein the respective and specific asset deletion action further comprises: deleting the at least one asset from the storage device.

12. The computing device of claim 8, wherein the steps further include, in response to determining that the issued asset deletion request has not caused the second amount of storage space to be made available: displaying a user interface that identifies particular assets associated with at least some of the plurality of applications that can be deleted to free the second amount of storage space required to store the at least one asset.

13. The computing device of claim 8, wherein the issued asset deletion request is assigned an urgency level that controls how each application deletes assets.

14. At least one non-transitory computer readable storage medium configured to store instructions that, when executed by at least one processor included in a computing device, cause the computing device to manage available storage space by implementing a delete daemon configured to carry out steps that include: receiving, for each application of a plurality of applications installed on the computing device, a respective and specific asset deletion action to be performed by the application to make a first amount of storage space associated with application available when the application receives an asset deletion request from the delete daemon; receiving a request to store at least one asset on a storage device that is communicably coupled to the computing device, wherein the request specifies a second amount of storage space that is required to store the at least one asset; in response to determining that the amount of storage space is not available on the storage device, and, for each application of the plurality of applications: issuing, to each application, the asset deletion request to cause each application to perform the respective and specific asset deletion action; and in response to determining that the issued asset deletion request has caused the second amount of storage space to be made available: causing the at least one asset to be stored on the storage device.

15. The at least one non-transitory computer readable storage medium of claim 14, wherein, for each application, the respective and specific asset deletion action is selected by a user by way of a user interface presented on a display device that is communicably coupled to the computing device.

16. The at least one non-transitory computer readable storage medium of claim 15, wherein the respective and specific asset deletion action comprises: copying at least one asset to a remote storage service that is accessible to the computing device.

17. The at least one non-transitory computer readable storage medium of claim 16, the respective and specific asset deletion action further comprises: deleting the at least one asset from the storage device.

18. The at least one non-transitory computer readable storage medium of claim 14, wherein the steps further include, in response to determining that the issued asset deletion request has not caused the second amount of storage space to be made available: displaying a user interface that identifies particular assets associated with at least some of the plurality of applications that can be deleted to free the second amount of storage space required to store the at least one asset.

19. The at least one non-transitory computer readable storage medium of claim 14, wherein each application of the plurality of applications is configured to prioritize each asset of one or more assets for deletion based on one or more of the following:
   whether the asset can be derived from asset on the storage device,
   a last access date associated with the asset,
   a size associated with the asset,
   a consumption level associated with the asset,
   whether the asset is a duplicate asset,
   whether the asset is included in a trash folder,
   an importance value associated with the asset, or
   contextual conditions associated with the computing device.

20. The at least one non-transitory computer readable storage medium of claim 14, wherein the issued asset deletion request is assigned an urgency level that controls how each application deletes assets.

* * * * *